(12) United States Patent
Chen

(10) Patent No.: US 7,216,672 B1
(45) Date of Patent: May 15, 2007

(54) FLOW DIVIDING DEVICE FOR GARDENING PIPES

(75) Inventor: Chin-Yuan Chen, Changhua Hsien (TW)

(73) Assignee: Shin Tai Spurt Water of the Garden Tools Co., Ltd., Changhua Hsien (TW)

( * ) Notice: Subject to any disclaimer, the term of this patent is extended or adjusted under 35 U.S.C. 154(b) by 0 days.

(21) Appl. No.: 11/301,890

(22) Filed: Dec. 13, 2005

(51) Int. Cl.
  *F16K 11/22* (2006.01)
(52) U.S. Cl. .................. 137/883; 137/886; 251/149.8
(58) Field of Classification Search ................ 137/883, 137/886, 887; 251/149.8, 347
  See application file for complete search history.

(56) References Cited

U.S. PATENT DOCUMENTS 1,472,265 A * 10/1923 Bell ........................... 137/883
2,598,961 A * 6/1952 Andrus ...................... 137/883
3,459,221 A * 8/1969 Axelrod ..................... 137/883
3,918,484 A * 11/1975 Lamb ........................ 137/553
4,432,392 A * 2/1984 Paley ........................ 137/883
5,595,207 A * 1/1997 Jiles ............................ 137/38
6,089,263 A * 7/2000 Dumser ..................... 137/552
6,830,062 B2 * 12/2004 Montpetit .................... 137/59

* cited by examiner

*Primary Examiner*—John Fox
(74) *Attorney, Agent, or Firm*—Alan Kamrath; Kamrath & Associates PA

(57) ABSTRACT

A flow dividing device for gardening pipes includes a main body, and a plurality of water control switches each mounted on the main body. Each of the water control switches includes a movable member, a push member, a control knob, a universal connector, a pivot seat, a pipe connector, and a bushing. Thus, the water flow of each of the water control switches is opened and closed by rotation of the control knob, thereby facilitating a user operating each of the water control switches. In addition, each of the water control switches is angle adjustable so as to adjust the angle between each of the gardening pipes and the main body.

20 Claims, 4 Drawing Sheets

FLOW DIVIDING DEVICE FOR GARDENING PIPES

BACKGROUND OF THE INVENTION

1. Field of the Invention

The present invention relates to a flow dividing device and, more particularly, to a flow dividing device for gardening pipes.

2. Description of the Related Art

A conventional flow dividing device for gardening pipes comprises a main body having a first side provided with a plurality of water outlets and a second side provided with a water source connector connected to a water source to supply water to the water outlets, a plurality of pipe connectors each mounted on a respective one of the water outlets of the main body and each connected to a gardening pipe which is connected to a water output equipment, such as a sprinkler or the like, and a plurality of control valves mounted on a respective one of the water outlets of the main body to open and close the respective water outlet. However, the conventional flow dividing device has a complicated construction, thereby increasing the costs of fabrication. In addition, the control valves and the pipe connectors are mounted individually, so that the conventional flow dividing device is not operated easily and conveniently.

SUMMARY OF THE INVENTION

The primary objective of the present invention is to provide a flow dividing device for gardening pipes, wherein the water flow of each of the water control switches is opened and closed by rotation of the control knob, thereby facilitating a user operating each of the water control switches.

Another objective of the present invention is to provide a flow dividing device for gardening pipes, wherein the pivot seat is pivotally mounted on the universal connector, so that each of the water control switches is angle adjustable so as to adjust the angle between each of the gardening pipes and the main body.

A further objective of the present invention is to provide a flow dividing device for gardening pipes, wherein the flow dividing device has a simplified construction, thereby facilitating assembly of the flow dividing device, and thereby decreasing costs of fabrication of the flow dividing device.

Further benefits and advantages of the present invention will become apparent after a careful reading of the detailed description with appropriate reference to the accompanying drawings.

DETAILED DESCRIPTION OF THE INVENTION

Figure 1:
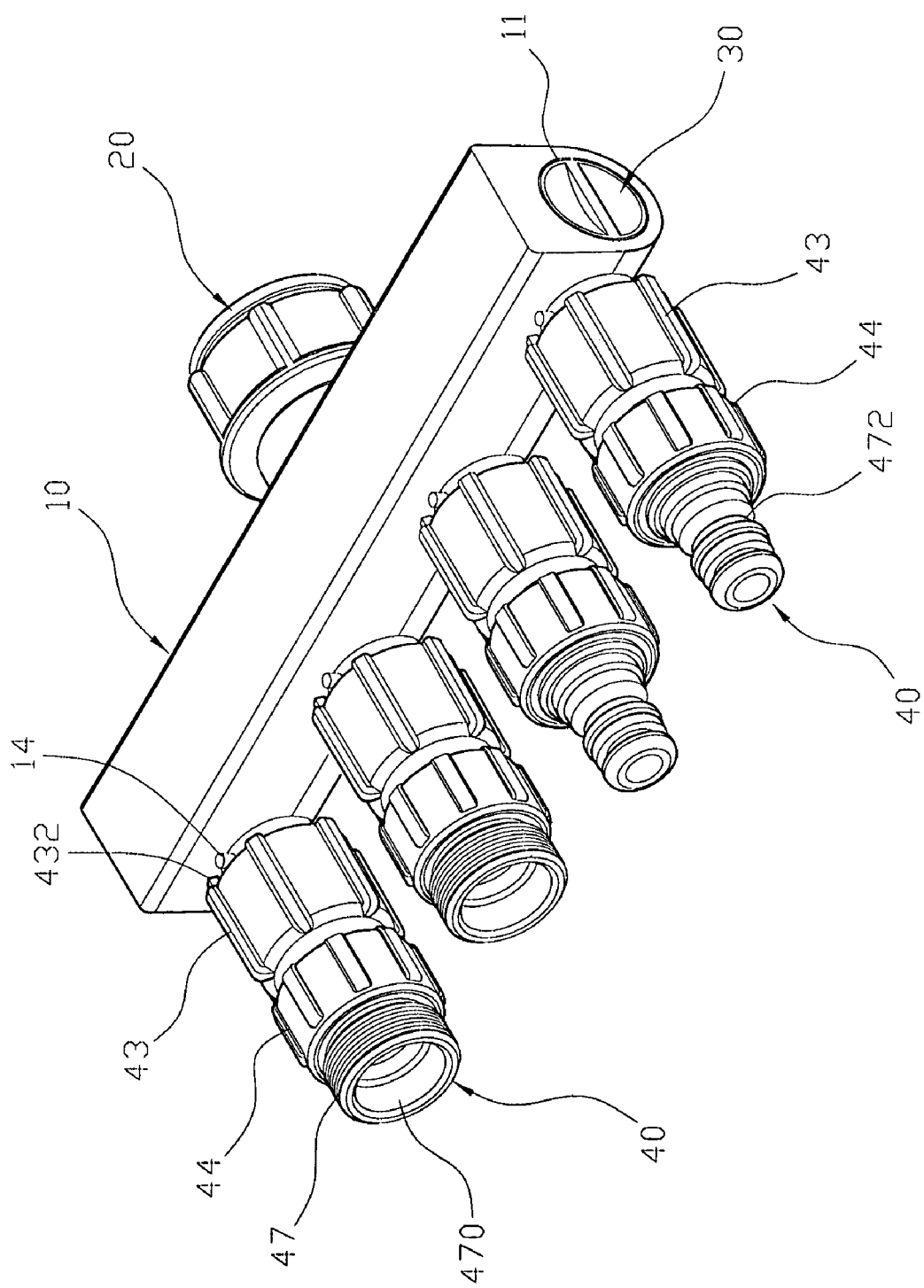
FIG. 1 is a perspective view of a flow dividing device for gardening pipes in accordance with the preferred embodiment of the present invention.
Figure 2:
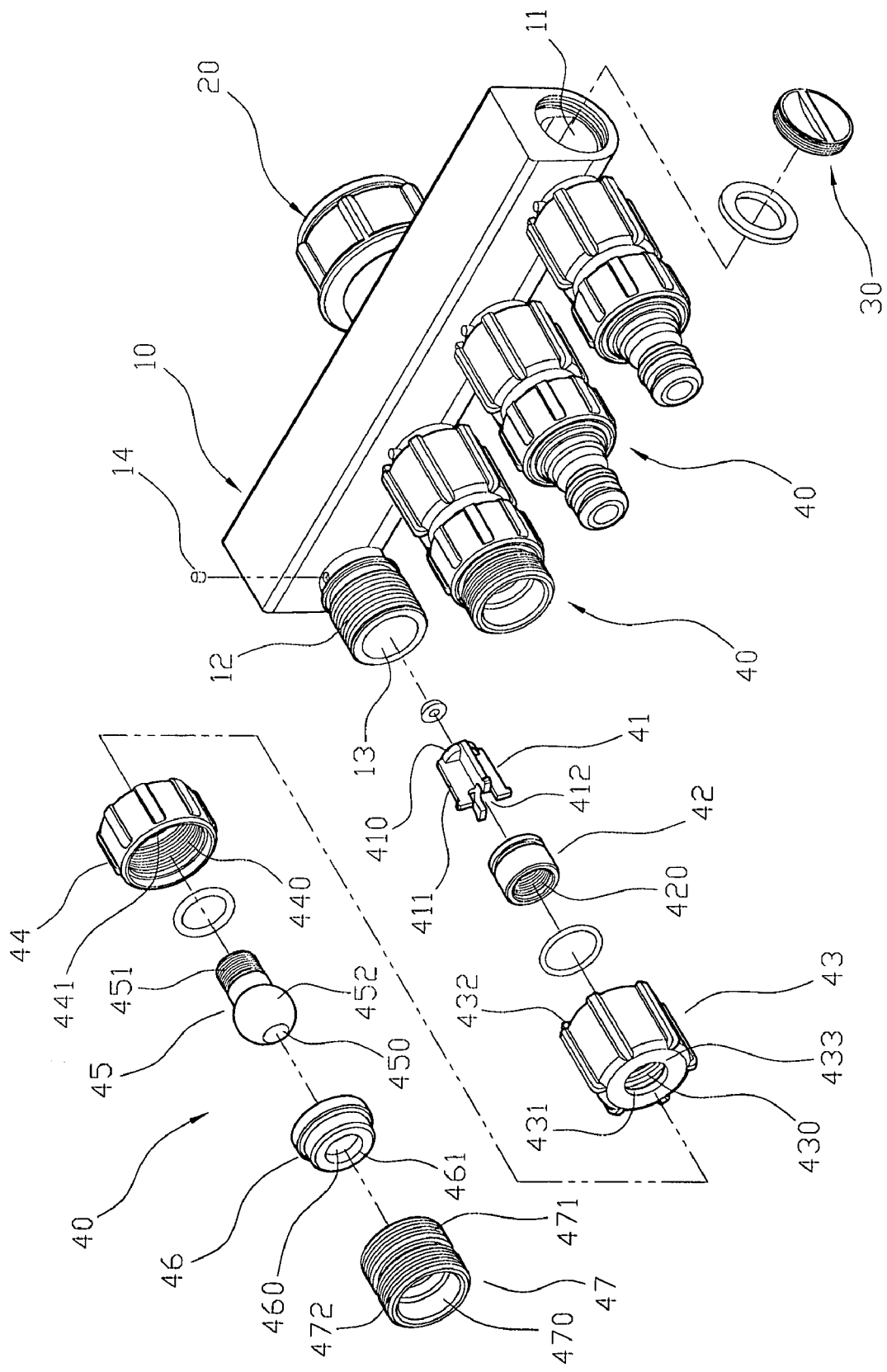
FIG. 2 is an exploded perspective view of the flow dividing device as shown in FIG. 1.
Figure 3:
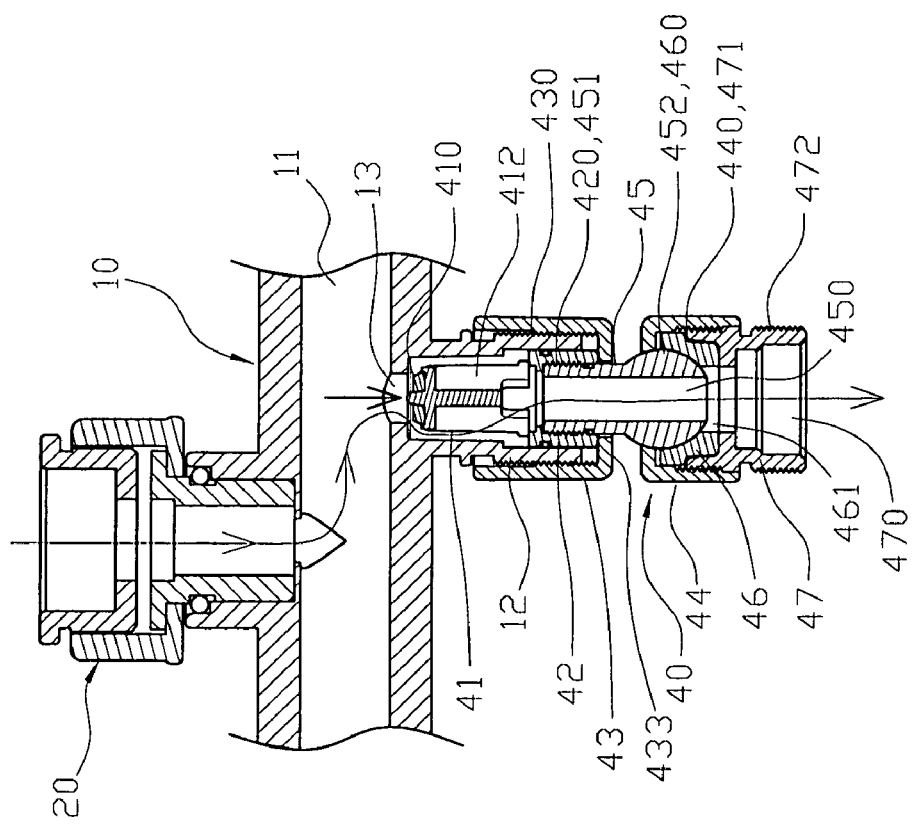
FIG. 3 is a partially plan cross-sectional view of the flow dividing device as shown in FIG. 1.

Referring to the drawings and initially to FIGS. 1–3, a flow dividing device for gardening pipes in accordance with the preferred embodiment of the present invention comprises a main body 10 having an inside formed with a water chamber 11 and having a first side provided with a plurality of mounting studs 12 each having a water passage 13 connected to the water chamber 11 and a second side provided with a water source connector 20 connected to the water chamber 11 to supply water into the water chamber 11, and a plurality of water control switches 40 each mounted on a respective one of the mounting studs 12 of the main body 10 to open and close the water passage 13 of the respective mounting stud 12 and each connected to a gardening pipe (not shown).

The water chamber 11 of the main body 10 has an open end wall, and a closure tap 30 is mounted on the open end wall of the water chamber 11 of the main body 10. Each of the mounting studs 12 of the main body 10 has an outer thread. The water passage 13 of each of the mounting studs 12 has a stepped shape and has a first hole 130 connected to the water chamber 11 and a second hole 132 having a diameter greater than that of the first hole 130. Each of the mounting studs 12 has a periphery provided with a limit stub 14 located adjacent to the first side of the main body 10.

Each of the water control switches 40 includes a movable member 41 movably mounted in the respective mounting stud 12 of the main body 10 to open and close the water passage 13 of the respective mounting stud 12, a push member 42 movably mounted in the respective mounting stud 12 of the main body 10 and rested on the movable member 41 to push the movable member 41 toward the water passage 13 of the respective mounting stud 12, a control knob 43 rotatably and movably mounted on the respective mounting stud 12 of the main body 10 and rested on the push member 42 to push the push member 42 toward the movable member 41, a universal connector 45 mounted on the control knob 43, a pivot seat 44 pivotally mounted on the universal connector 45, a pipe connector 47 secured to the pivot seat 44 to pivot therewith, and a bushing 46 mounted in the pivot seat 44 and located between the universal connector 45 and the pipe connector 47.

The movable member 41 of each of the water control switches 40 has a first end provided with a stop portion 410 that is movable to open and close the water passage 13 of the respective mounting stud 12 and a second end provided with a resting portion 411 rested on a first end of the push member 42. The stop portion 410 of the movable member 41 has a diameter greater than that of the first hole 130 of the water passage 13 and smaller than that of the second hole 132 of the water passage 13. The resting portion 411 of the movable member 41 has a plurality of conduits 412 connected to the water passage 13 of the respective mounting stud 12.

The push member 42 of each of the water control switches 40 has an inside formed with an inner thread 420.

The control knob 43 of each of the water control switches 40 has a cap shape and has an inside formed with a screw bore 430 screwed onto the outer thread of the respective mounting stud 12 so that the control knob 43 is movable relative to the respective mounting stud 12 by rotation of the control knob 43. The control knob 43 of each of the water control switches 40 has a first end provided with an inwardly extending resting flange 433 rested on a second end of the push member 42 to push the push member 42 and a second end provided with a limit edge 432 that is movable to rest on the limit stub 14 of the respective mounting stud 12 to limit rotation of the control knob 43. The resting flange 433 of the control knob 43 is formed with a mounting hole 431 mounted on the universal connector 45. The mounting hole 431 of the control knob 43 has a diameter smaller than an outer diameter of the push member 42.

The universal connector 45 of each of the water control switches 40 has an inside formed with a channel 450 connected to the conduits 412 of the movable member 41. The universal connector 45 of each of the water control switches 40 has a first end extended through the mounting hole 431 of the control knob 43 and formed with an outer thread 451 screwed into the inner thread 420 of the push member 42 to secure the universal connector 45 to the push member 42 and a second end protruded outwardly from the control knob 43 and formed with an adjusting ball 452.

The pivot seat 44 of each of the water control switches 40 has a cap shape and has an end face formed with a pivot hole 441 pivotally mounted on the adjusting ball 452 of the universal connector 45. The pivot seat 44 of each of the water control switches 40 has an inside formed with a screw bore 440.

The bushing 46 of each of the water control switches 40 has an inside formed with a conducting hole 461 connected to the channel 450 of the universal connector 45. The bushing 46 of each of the water control switches 40 has a side formed with a ball hole 460 pivotally mounted on the adjusting ball 452 of the universal connector 45 so that the adjusting ball 452 of the universal connector 45 is sandwiched between the pivot seat 44 and the bushing 46.

The pipe connector 47 of each of the water control switches 40 has an inside formed with a water outlet hole 470 connected to the conducting hole 461 of the bushing 46. The pipe connector 47 of each of the water control switches 40 has a first end formed with an outer thread 471 screwed into the screw bore 440 of the pivot seat 44 to press the bushing 46 so that the bushing 46 is closely fit onto the adjusting ball 452 of the universal connector 45. The pipe connector 47 of each of the water control switches 40 has a second end formed with a connection 472 connected to the gardening pipe.

In operation, referring to FIGS. 1–3, the control knob 43 is movable relative to the respective mounting stud 12 by rotation of the control knob 43. Thus, when the control knob 43 is movable toward the respective mounting stud 12, the resting flange 433 of the control knob 43 pushes the push member 42 which pushes the movable member 41 which pushes the stop portion 410 to block the first hole 130 of the water passage 13 as shown in FIG. 3 to close the water passage 13 of the respective mounting stud 12 so as to interrupt the connection between the water chamber 11 of the main body 10 and each of the water control switches 40 so that the water contained in the water chamber 11 of the main body 10 cannot flow into each of the water control switches 40.

Figure 4:
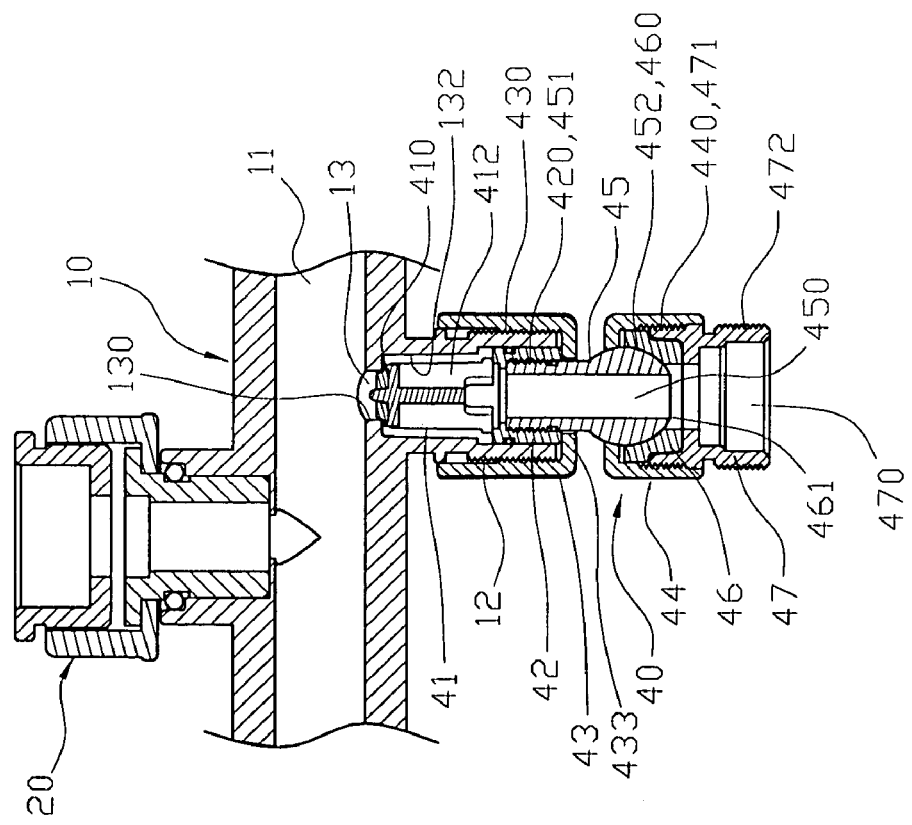
FIG. 4 is a schematic operational view of the flow dividing device as shown in FIG. 3.

Alternatively, referring to FIGS. 1–4, when the control knob 43 is movable outward relative to the respective mounting stud 12, the resting flange 433 of the control knob 43 is detached from the push member 42 which is detached from the movable member 41 which is pushed outward relative to the respective mounting stud 12 by a water pressure contained in the water chamber 11 of the main body 10 to drive the stop portion 410 to detach from the first hole 130 of the water passage 13 as shown in FIG. 4 to open the water passage 13 of the respective mounting stud 12 so as to connect the water chamber 11 of the main body 10 and each of the water control switches 40 so that the water contained in the water chamber 11 of the main body 10 can flow into each of the water control switches 40 and in turn flows through the conduits 412 of the movable member 41, the channel 450 of the universal connector 45, the conducting hole 461 of the bushing 46 and the water outlet hole 470 of the pipe connector 47 into the gardening pipe.

Figure 5:
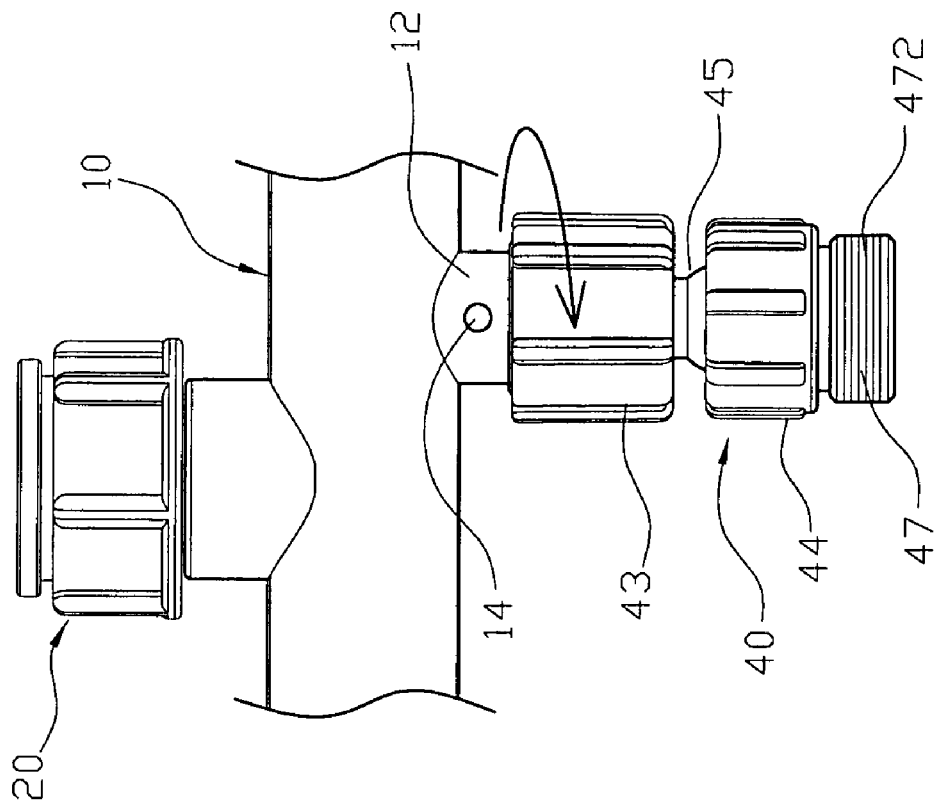
FIG. 5 is a partially top plan operational view of the flow dividing device as shown in FIG. 1.
Figure 6:
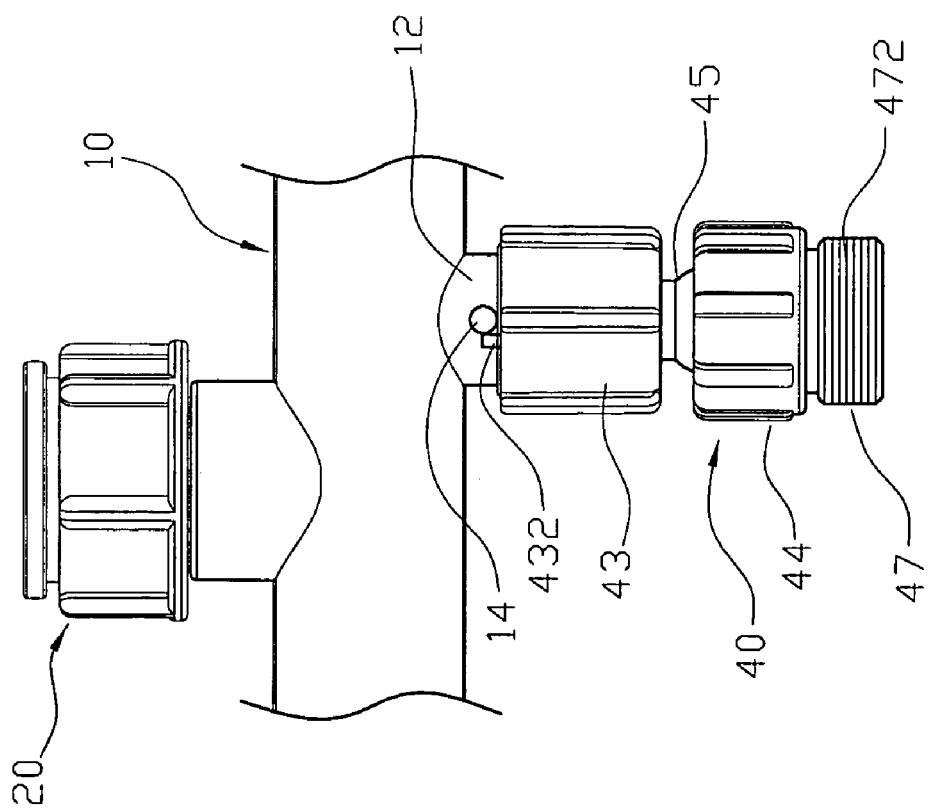
FIG. 6 is a schematic operational view of the flow dividing device as shown in FIG. 5.

As shown in FIGS. 5 and 6, the limit edge 432 of the control knob 43 is movable to rest on the limit stub 14 of the respective mounting stud 12 to prevent an excessive rotation of the control knob 43.

Accordingly, the water flow of each of the water control switches is opened and closed by rotation of the control knob, thereby facilitating a user operating each of the water control switches. In addition, the pivot seat is pivotally mounted on the universal connector, so that each of the water control switches is angle adjustable so as to adjust the angle between each of the gardening pipes and the main body. Further, the flow dividing device has a simplified construction, thereby facilitating assembly of the flow dividing device, and thereby decreasing costs of fabrication of the flow dividing device.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A flow dividing device, comprising a main body having an inside formed with a water chamber and having a first side provided with a plurality of mounting studs each having a water passage connected to the water chamber and a second side provided with a water source connector connected to the water chamber, and a plurality of water control switches each mounted on a respective one of the mounting studs of the main body, wherein each of the water control switches includes:

a movable member movably mounted in the respective mounting stud of the main body to open and close the water passage of the respective mounting stud;

a push member movably mounted in the respective mounting stud of the main body and rested on the movable member to push the movable member toward the water passage of the respective mounting stud;

a control knob rotatably and movably mounted on the respective mounting stud of the main body and rested on the push member to push the push member toward the movable member;

a universal connector mounted on the control knob;

a pivot seat pivotally mounted on the universal connector;

a pipe connector secured to the pivot seat to pivot therewith; and a bushing mounted in the pivot seat and located between the universal connector and the pipe connector.

2. The flow dividing device in accordance with claim 1, wherein the movable member of each of the water control switches has a first end provided with a stop portion that is movable to open and close the water passage of the respective mounting stud and a second end provided with a resting portion rested on a first end of the push member.

3. The flow dividing device in accordance with claim 2, wherein the water passage of each of the mounting studs has a first hole connected to the water chamber and a second hole having a diameter greater than that of the first hole, and the stop portion of the movable member has a diameter greater than that of the first hole of the water passage and smaller than that of the second hole of the water passage.

4. The flow dividing device in accordance with claim 1, wherein the water passage of each of the mounting studs has a stepped shape.

5. The flow dividing device in accordance with claim 2, wherein the resting portion of the movable member has a plurality of conduits connected to the water passage of the respective mounting stud.

6. The flow dividing device in accordance with claim 1, wherein each of the mounting studs of the main body has an outer thread, and the control knob of each of the water control switches has an inside formed with a screw bore screwed onto the outer thread of the respective mounting stud so that the control knob is movable relative to the respective mounting stud by rotation of the control knob.

7. The flow dividing device in accordance with claim 1, wherein the control knob of each of the water control switches has a cap shape.

8. The flow dividing device in accordance with claim 1, wherein the control knob of each of the water control switches has a first end provided with an inwardly extending resting flange rested on a second end of the push member to push the push member.

9. The flow dividing device in accordance with claim 8, wherein the resting flange of the control knob is formed with a mounting hole mounted on the universal connector.

10. The flow dividing device in accordance with claim 9, wherein the mounting hole of the control knob has a diameter smaller than an outer diameter of the push member.

11. The flow dividing device in accordance with claim 8, wherein each of the mounting studs has a periphery provided with a limit stub located adjacent to the first side of the main body, and the control knob of each of the water control switches has a second end provided with a limit edge that is movable to rest on the limit stub of the respective mounting stud to limit rotation of the control knob.

12. The flow dividing device in accordance with claim 5, wherein the universal connector of each of the water control switches has an inside formed with a channel connected to the conduits of the movable member.

13. The flow dividing device in accordance with claim 1, wherein the push member of each of the water control switches has an inside formed with an inner thread, and the universal connector of each of the water control switches has a first end extended through the control knob and formed with an outer thread screwed into the inner thread of the push member to secure the universal connector to the push member and a second end protruded outwardly from the control knob and formed with an adjusting ball.

14. The flow dividing device in accordance with claim 13, wherein the pivot seat of each of the water control switches has an end face formed with a pivot hole pivotally mounted on the adjusting ball of the universal connector.

15. The flow dividing device in accordance with claim 1, wherein the pivot seat of each of the water control switches has a cap shape.

16. The flow dividing device in accordance with claim 12, wherein the bushing of each of the water control switches has an inside formed with a conducting hole connected to the channel of the universal connector.

17. The flow dividing device in accordance with claim 13, wherein the bushing of each of the water control switches has a side formed with a ball hole pivotally mounted on the adjusting ball of the universal connector so that the adjusting ball of the universal connector is sandwiched between the pivot seat and the bushing.

18. The flow dividing device in accordance with claim 16, wherein the pipe connector of each of the water control switches has an inside formed with a water outlet hole connected to the conducting hole of the bushing.

19. The flow dividing device in accordance with claim 1, wherein the pivot seat of each of the water control switches has an inside formed with a screw bore, and the pipe connector of each of the water control switches has a first end formed with an outer thread screwed into the screw bore of the pivot seat to press the bushing so that the bushing is closely fit onto the adjusting ball of the universal connector and has a second end formed with a connection.

20. The flow dividing device in accordance with claim 3, wherein when the control knob is movable toward the respective mounting stud, the control knob pushes the push member which pushes the movable member which pushes the stop portion to block the first hole of the water passage to close the water passage of the respective mounting stud so as to interrupt a connection between the water chamber of the main body and each of the water control switches, and when the control knob is movable outward relative to the respective mounting stud, the resting flange of the control knob is detached from the push member which is detached from the movable member which is pushed outward relative to the respective mounting stud by a water pressure contained in the water chamber of the main body to drive the stop portion to detach from the first hole of the water passage to open the water passage of the respective mounting stud so as to connect the water chamber of the main body and each of the water control switches so that water contained in the water chamber of the main body can flow into each of the water control switches.

\* \* \* \* \*